July 11, 1933.     C. W. JONES     1,918,039
PROCESS OF EXTRACTING IODINE FROM AQUEOUS SOLUTIONS
Filed Feb. 23, 1928
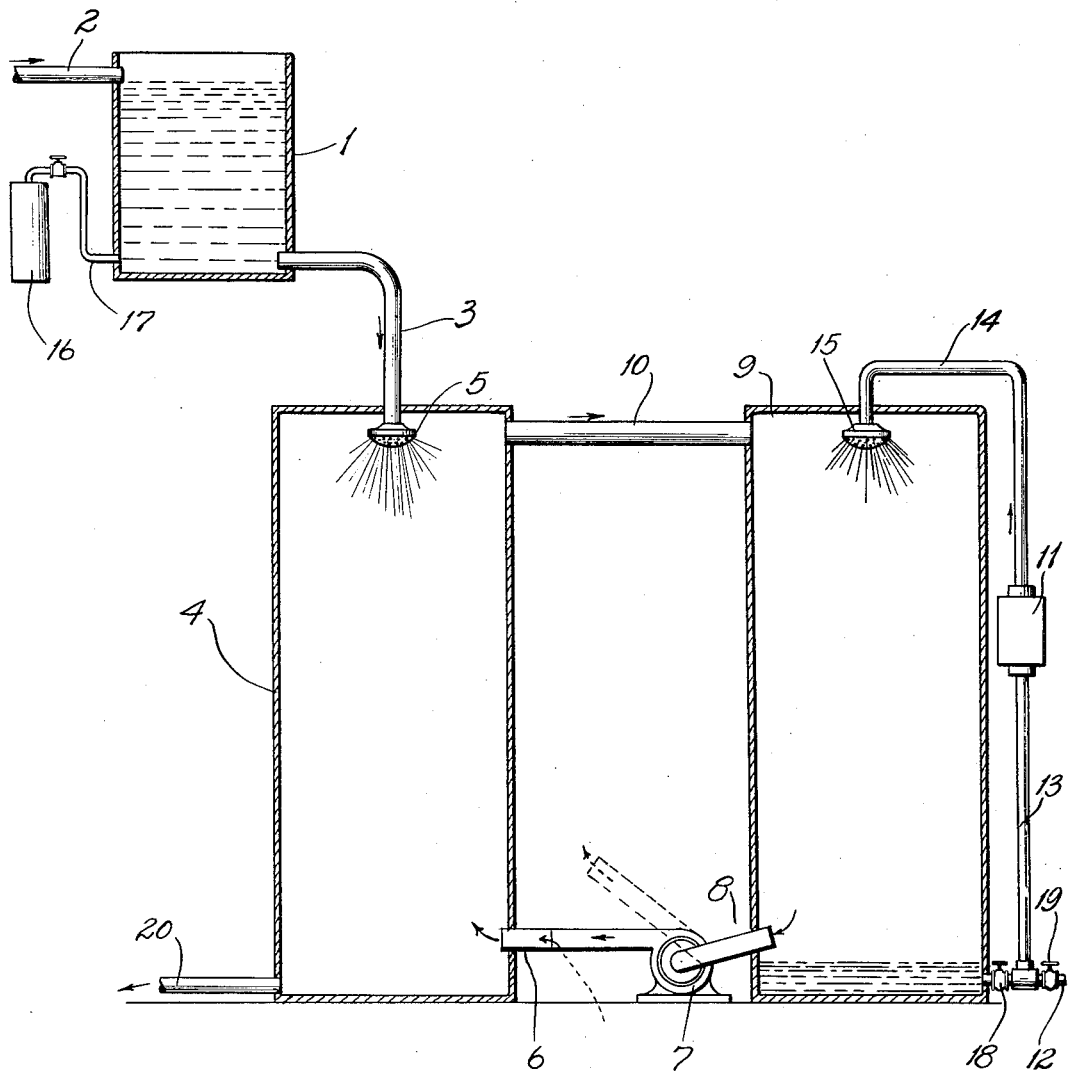
INVENTOR:
COULTER W. JONES.
By Elliott Harrington
ATTORNEYS.

Patented July 11, 1933

1,918,039

UNITED STATES PATENT OFFICE

COULTER W. JONES, OF MIDLAND, MICHIGAN, ASSIGNOR TO JONES CHEMICAL COMPANY, INCORPORATED, OF McDADE, LOUISIANA, A CORPORATION OF LOUISIANA

PROCESS OF EXTRACTING IODINE FROM AQUEOUS SOLUTIONS

Application filed February 23, 1928. Serial No. 256,237.

This invention relates to a novel process for the extraction of iodine from aqueous solutions, and is particularly applicable to the extraction of comparatively small amounts of iodine from mineral waters, natural brines, and mother liquors resulting from the partial removal of the saline contents from salt water or natural brine. These solutions usually contain iodine compounds in very small proportions, and it would not be economically practical to evaporate large quantities of water, or to handle a large tonnage of low-priced salts in order to recover a comparatively small amount of iodine. Mineral waters, brines, and mother liquors of the United States are not, to my knowledge, at present being worked for the recovery of iodine, and I am not aware that a successful method has been developed that will profitably recover their small iodine content. By my improved process, the greater part of the comparatively small amount of iodine found in mineral waters, brines, and mother liquors may be economically recovered without preliminary concentration of the aqueous solution or the removal of other products therefrom.

According to my improved process, the extraction of iodine from aqueous solutions is accomplished, first, by treating the solution in a manner to free the iodine from its chemical combinations without thereby liberating other substances which will militate against its existence in the free state. The liberated iodine dissolves in the aqueous solution and is removed therefrom by bringing in contact with the solution containing the iodine a current of an inert gas which has the property of taking up and carrying off the iodine from the solution. The iodine-laden gas is then brought in contact with a suitable absorbent or reagent with which the iodine reacts to form an iodine compound. From the resultant iodine compound, solid iodine or iodides may be prepared in well known ways.

By the term "inert gas" as herein used is meant any gas or mixture of gases that do not react with the iodine to form a compound. Examples of inert gases that may be used are steam, oxygen, nitrogen, air, and carbon dioxide. The above gases are given by way of illustration. There are, however, many other inert gases that might be used. By preference, I use air for purposes of economy.

The iodine is first liberated from its combinations in the aqueous solution. Among agents suitable for this, ferric and cupric salts in neutral or acid solutions, chlorine or bromine in nearly neutral, neutral or acid solutions, for example, can be used to free the iodine; and where the solution happens to be initially basic, it may be neutralized or slightly acidified for the treatment. If preferred, the liberation may be accomplished electrolytically. The process is practically the same whether caused by the addition of a chemical agent, as above described, or by electrolytic decomposition of the salts in the solution. For the purpose of illustration, I will describe the process in which chlorine is used for the purpose of thus liberating the iodine.

In the accompanying drawing, I have illustrated diagrammatically a form of apparatus which may be employed in practicing my process.

The numeral 1 indicates a tank for containing the aqueous solution from which iodine is to be liberated. The solution is supplied to the tank from any suitable source by means of a pipe 2. Leading out from the bottom of tank 1 is a pipe 3 which is passed through the top of an enlongated tank or tower 4, and within said tower and near the top thereof is provided with a spray nozzle 5 for spraying the solution so as to bring it in intimate contact with air or other inert gas entering the tower at the bottom thereof through a pipe 6. The numeral 7 indicates a combined suction fan and blower, the inlet to which, indicated by 8, communicates with a second tower 9 at a suitable distance above the bottom thereof. A pipe 10 is connected to and communicates with the towers 4 and 9 at the upper ends thereof. The numeral 11 indicates a pump which communicates with the tower 9 near the base thereof through the medium of a valve 18 and a vertical pipe 13 leading to the bottom of the pump. From the upper end of the pump a pipe 14 passes through the top of tower 9 and is provided on its end within the tower and near the upper end of the latter with a spray nozzle 15. The numeral 16 indicates a cylinder containing liquid chlorine under pressure, which is supplied to the tank 1 through pipe 17 to dissolve in the aqueous solution therein.

In practicing the invention, the aqueous solution, which may be a mineral water, a natural brine, or mother liquor, is continuously supplied to the tank 1 through pipe 2, and at the same time the chlorine is admitted into the bottom of tank 1 through the pipe 17 so as to sufficiently oxidize the solution to liberate substantially all of the iodine from its combinations. Assuming the iodine to be combined with the metal sodium, the reaction occurring would be expressed by the following formula:

$$2NaI + Cl_2 = 2NaCl + I_2$$

The oxidized solution containing the dissolved iodine passes out of the tank through pipe 3 and is delivered into the tower 4, preferably in the form of a spray, and descending therein is brought into intimate contact with a rising volume of air or other inert gas entering the tower through pipe 6. Such air or inert gas will remove the dissolved iodine and the iodine-laden air or gas passes out of tower 4 through pipe 10 and into the tower 9 where it comes in contact with a continuous spray of a suitable alkaline solution, such as soda lye or as indicated below, soda ash which will absorb the iodine from the air. The reaction occurring in the tower 9 may be expressed by the following formula:

$$6I + 3Na_2CO_3 = 5NaI + NaIO_3 + 3CO_2$$

The alkaline solution is initially supplied to the tower 9 and is continuously pumped therefrom and circulated through said tower in the form of a spray, as previously described, until the greater part of its alkaline content has been neutralized by the iodine. When this occurs, the pump 11 may be stopped, valves 18 and 19 in the pipe 12 opened, and the iodide liquor run out of tower 9, after which a fresh supply of the alkaline solution would be supplied to the tower though the pipe 12 and the valve 19 closed, and the pump again started. The iodide solution removed from tower 9 will then be treated in well known ways to produce commercial iodine or iodides. The aqueous solution falling to the bottom of tower 4 continuously drains therefrom through a pipe 20 and may, if desired, pass directly to the sewer. If preferred, the air in tower 9 from which the iodine has been removed may be recirculated through the tower 4, and when this is done, the pipe 6 will communicate directly with the blower 7, as shown by full lines in the drawing. Otherwise, as shown by dotted lines, the used air from tower 9 could be discharged into the atmosphere and a fresh supply of air be continuously drawn in through pipe 6. In the latter operation, fresh air will be drawn in through pipe 6 by suction caused by the operation of the blower 7.

While I have described the use of soda ash solution for absorbing iodine from the iodine-laden air or gas, other alkali carbonates or hydroxides or alkaline earth hydroxides may be used. An iodide solution is a good absorbent for iodine, and could be used. Also, similar results can be obtained by passing the iodine-laden air or gas over moistened metal, such as iron. If, for example, moistened iron be used in the tower 9 for this purpose, the reaction occurring would be expressed by the formula:

$$I_2 + Fe = FeI_2$$

I have chosen to illustrate the oxidation step as taking place in tank 1, but this step may be accomplished in the blowing-out tower 4 by (a) adding a solution containing an oxidizing agent along with the iodine-containing solution; and (b) chlorine or bromine gas, or other suitable oxidizing reagents may be added to the iodine-containing solution in the tower at any suitable point between the top and bottom thereof.

The oxidation of the iodine-containing solution should be sufficient in extent to liberate substantially all iodine and, in addition, to oxidize any ferrous salts, sulphur, and other analogous compounds to a degree that they will not reduce the liberated iodine. I have found that oxidation appreciably in excess of the limits above stated is objectionable; for example, such oxidizing agents as chlorine or bromine, when used in excess, will rapidly convert the liberated iodine to hypo-iodites and iodates, in which combinations the iodine cannot be blown out.

The above described process may be operated at, above, or below, atmospheric pressure, nor is the temperature range limited. However, it is obvious that with any particular inert gas used, there are certain pressure and temperature ranges necessary to observe in order to maintain it in the gaseous form.

I claim:

1. A process of recovering iodine from aqueous solutions containing iodine compounds, which includes the steps of liberating the iodine from its chemical combinations therein, and blowing air through such solution while disseminated and without substantial increase in temperature, to extract the liberated iodine therefrom.

2. A process of recovering iodine from aqueous solutions containing iodine compounds, which includes the steps of liberating the iodine from its chemical combinations therein, and opposing a stream of such solution in finely divided form and at a temperature approximating that of natural brine, with a stream of an inert gas non-condensable at room temperature, whereby the liberated iodine is blown out.

3. A process of recovering iodine from aqueous solutions containing iodine compounds, which includes the steps of liberating the iodine from its chemical combinations therein, and opposing a stream of such solution in finely divided form and at a temperature approximating that of natural brine, with a stream of air, whereby the liberated iodine is blown out.

4. The process of recovering iodine from non-alkaline aqueous solutions containing iodine compounds, which comprises liberating the iodine from its chemical combinations therein, by treating with a more active halogen, and bringing at approximately the same temperature the resulting dissolved iodine containing aqueous solution in disseminated form into contact with a stream of air, whereby the liberated iodine is blown out.

5. The process of recovering iodine from non-alkaline aqueous solutions containing iodine compounds, which comprises liberating the iodine from its chemical combinations therein by treating with chlorine, bringing at approximately the same temperature the resulting dissolved iodine containing aqueous solution in disseminated form into contact with a stream of air, whereby the liberated iodine is blown out.

6. A process of recovering iodine from aqueous solutions containing iodine compounds, which includes the steps of liberating the iodine from its chemical combinations therein, blowing an inert gas non-condensable at room temperature through a stream of said solution in finely divided form and without substantial increase in temperature, to extract the liberated iodine therefrom, and then passing such gas in parallel flow contact with a finely divided stream of an alkaline absorbing agent for iodine.

7. A process of recovering iodine from aqueous solutions containing iodine compounds, which includes the steps of liberating the iodine from its chemical combinations therein, blowing air through a stream of said solution in finely divided form and at approximately natural brine temperature, to extract the liberated iodine therefrom, and then passing such gas in parallel flow contact with a finely divided stream of an alkaline absorbing agent for iodine.

8. The process of recovering iodine from slightly acid aqueous solutions containing iodine compounds, which comprises liberating the iodine from its chemical combinations therein, without substantial change in temperature bringing the dissolved iodine containing aqueous solution in disseminated form into contact with air to extract the iodine therefrom, and then contacting the iodine-laden gas with an absorbing agent.

9. The process of recovering iodine from non-alkaline aqueous solutions containing iodine compounds, which comprises liberating the iodine from its chemical combinations therein by oxidizing the solution to an extent sufficient to liberate substantially all of the iodine content but avoiding an appreciable excess of oxidation, bringing in disseminated form the aqueous solution containing the dissolved iodine, without substantial increase in temperature, into contact with an inert gas non-condensable at room temperature, to extract the iodine therefrom, and then contacting the iodine-laden gas with an absorbing agent forming an iodine compound.

10. The process of recovering iodine from non-alkaline aqueous solutions containing iodine compounds, which comprises liberating the iodine from its chemical combinations therein by oxidizing the solution to an extent sufficient to liberate substantially all of the iodine content but avoiding an appreciable excess of oxidation, bringing in disseminated form the aqueous solution containing the dissolved iodine, without substantial increase in temperature, into contact with an inert gas non-condensable at room temperature, to extract the iodine therefrom, then contacting the iodine-laden gas with an alkaline absorbing agent forming an iodine compound, and recovering the iodine from such compound.

11. The process of recovering iodine from aqueous solutions containing iodine compounds, which includes the steps of liberating the iodine from its chemical combinations therein by oxidizing the solution to an extent sufficient to liberate substantially all the iodine content but avoiding an appreciable excess of oxidation, bringing the solution containing the dissolved iodine at approximately natural brine temperature and in the form of a finely divided stream, against a current of air whereby such iodine is blown out, and then contacting the iodine-laden air with an absorbing agent capable of forming a compound with such iodine.

12. The process of recovering iodine from aqueous solutions containing iodine compounds, which includes the steps of liberating the iodine from its chemical combinations therein by oxidizing the solution to an extent sufficient to liberate substantially all the iodine content but avoiding an appreciable excess of oxidation, bringing the solution containing the dissolved iodine at approximately natural brine temperature and in the form of a finely divided stream against a current of air whereby such iodine is blown out, and then passing the iodine-laden air in parallel flow contact with a finely divided stream of an alkaline absorbing agent capable of forming a compound with such iodine.

13. The process of recovering iodine from non-alkaline aqueous solutions containing iodine compounds, which consists in liberating the iodine from its chemical combinations therein, disseminating and bringing said aqueous solution containing the dissolved iodine without substantial increase in temperature in countercurrent contact with an inert gas non-condensable at room temperature to extract the iodine therefrom, then causing the iodine-laden gas to come in contact with a suitable absorbing and combining agent for the iodine, thereby forming an iodide compound, and then recovering the iodine from such compound in the form of commercial iodine or iodides.

14. The process of recovering iodine from non-alkaline aqueous solutions containing iodine compounds, which comprises liberating the iodine from its chemical combinations therein, without substantial change in temperature bringing the dissolved iodine containing aqueous solution in disseminated form into contact with an inert gas non-condensable at room temperature to extract the iodine therefrom, and then contacting the iodine-laden gas with an absorbing agent selected from the group consisting of alkali carbonates, alkali hydroxides, alkaline earth hydroxides.

15. The process of recovering iodine from non-alkaline aqueous solutions containing iodine compounds, which comprises liberating the iodine from its chemical combinations therein, without substantial change in temperature bringing the dissolved iodine containing aqueous solution in disseminated form into contact with air to extract the iodine therefrom, and then contacting the iodine-laden gas with an alkali carbonate.

16. The process of recovering iodine from non-alkaline aqueous solutions containing iodine compounds, which comprises liberating the iodine from its chemical combinations therein, without substantial change in temperature bringing the dissolved iodine containing aqueous solution in disseminated form into contact with air to extract the iodine therefrom, and then contacting the iodine-laden gas with sodium carbonate.

17. The process of recovering iodine from non-alkaline aqueous solutions containing iodine compounds, which comprises liberating the iodine from its chemical combinations therein, without substantial change in temperature bringing the dissolved iodine containing aqueous solution in disseminated form into contact with an inert gas non-condensable at room temperature to extract the iodine therefrom, then contacting the iodine-laden gas with an agent for removing the iodine therefrom, and in cyclic manner returning the inert gas to the step of extracting iodine from the disseminated aqueous solution.

18. The process of recovering iodine from non-alkaline aqueous solutions containing iodine compounds, which comprises liberating the iodine from its chemical combinations therein, without substantial change in temperature bringing the dissolved iodine containing aqueous solution in disseminated form into contact with a gaseous mixture of air and carbon dioxide to extract the iodine therefrom, and then contacting the iodine-laden gas with an agent for removing the iodine therefrom.

19. The process of recovering iodine from non-alkaline aqueous solutions containing iodine compounds, which comprises liberating the iodine from its chemical combinations therein, without substantial change in temperature bringing the dissolved iodine containing aqueous solution in disseminated form into contact with nitrogen to extract the iodine therefrom, and then contacting the iodine-laden gas with an agent for removing the iodine therefrom.

In testimony whereof, I have hereunto set my hand.

COULTER W. JONES.